ROBERT L. SKINNER
INVENTOR

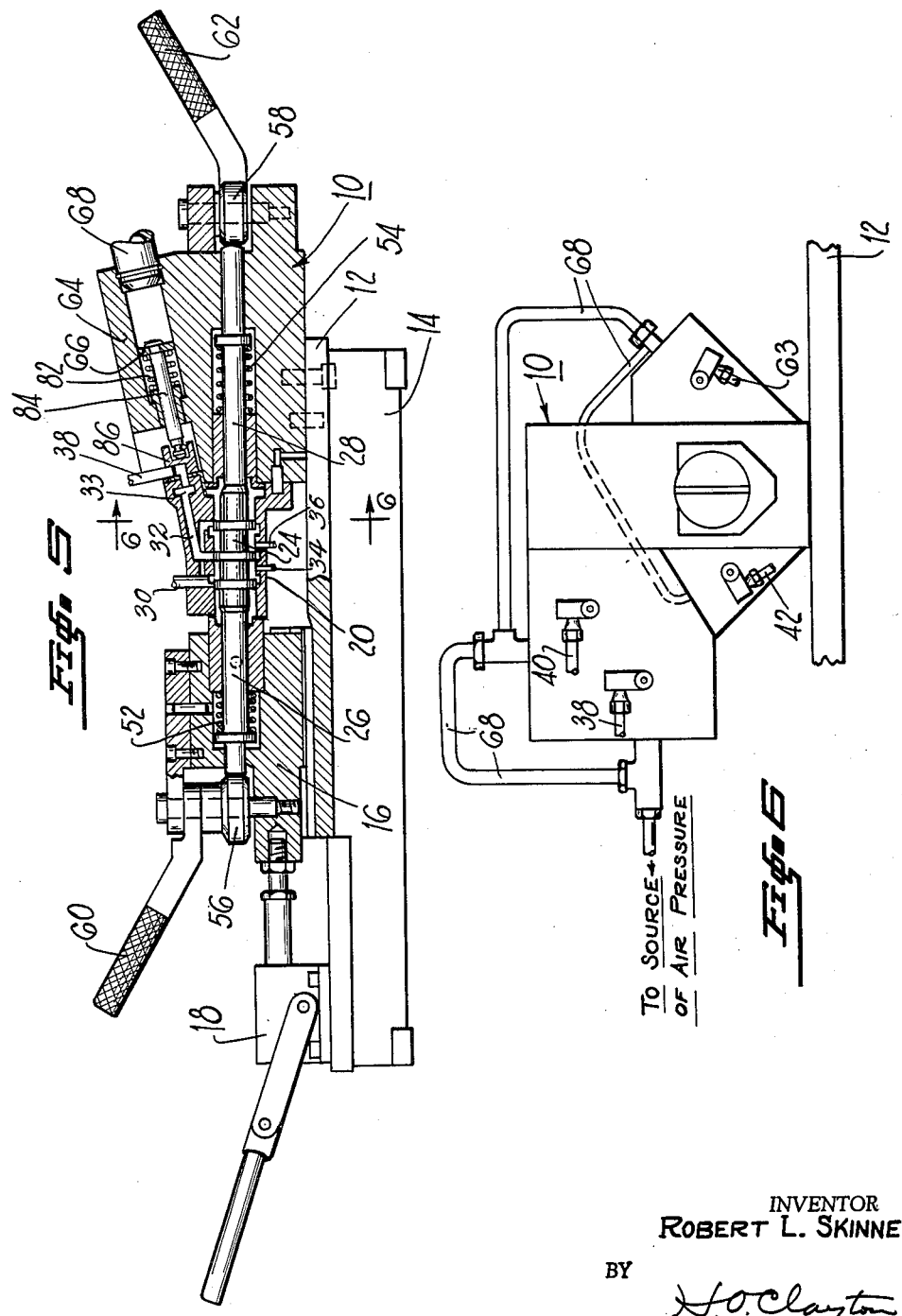

United States Patent Office 3,100,392
Patented Aug. 13, 1963

3,100,392
VALVE TESTING APPARATUS
Robert L. Skinner, South Bend, Ind., assignor to The Bendix Corporation, a corporation of Delaware
Filed Sept. 15, 1958, Ser. No. 761,014
3 Claims. (Cl. 73—46)

This invention relates in general to testing apparatus and in particular to an apparatus for testing a control valve which may be used as part of a power steering mechanism for automotive vehicles.

The hydraulic power steering mechanism of an automotive vehicle includes a control valve which is operable by the driver of said vehicle when he manipulates the steering wheel thereof. Now in order to insure a normal flow of power fluid through said valve it must be free of imperfections that would unduly block the flow of said fluid, via said valve, to the fluid reservoir of the mechanism and the fluid motor thereof contolled by said valve; and there must be no imperfections in the valve that would cause either internal or external valve leakage of a substantial degree.

My invention provides a testing apparatus for determining the presence or absence of said imperfections, said apparatus including a source of air pressure, pressure indicator means, and control means in the connections interconnecting said source, indicator means, and the valve being tested.

It is also an object of my invention to provide a relatively simple valve testing apparatus the manually actuated controls thereof consisting of four control buttons, the handle of a clamp for holding in place the valve to be tested, and two handles of a mechanism for positioning said valve during the test.

It is a further object of my invention to provide an apparatus for, in four tests, determining whether or not all of the ports of a four ported valve are sufficiently open to insure the proper flow of power fluid through the valve, whether or not there is any substantial internal valve leakage in the valve, and lastly whether or not there is any substantial external valve leakage through seals, etc., of said valve.

Other objects of my invention and desirable details of construction of parts will become apparent from the following detailed description of an illustrative embodiment of the invention, taken in conjunction with the accompanying drawing illustrating said embodiment, in which.

Figure 1:
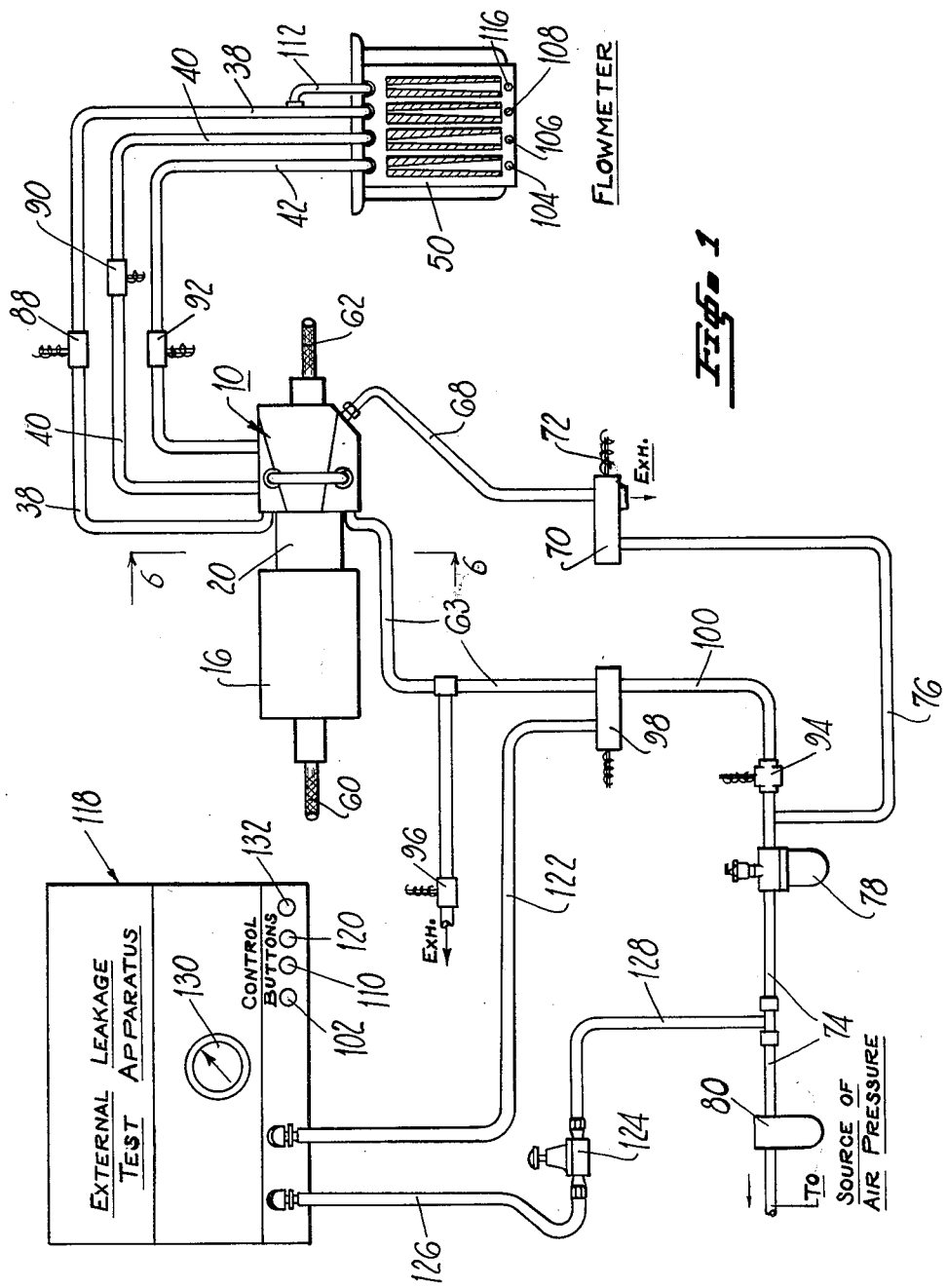
FIGURE 1 is a diagrammatic view disclosing the principal components and fluid conduits interconnecting the same of my invention.
Figure 2:
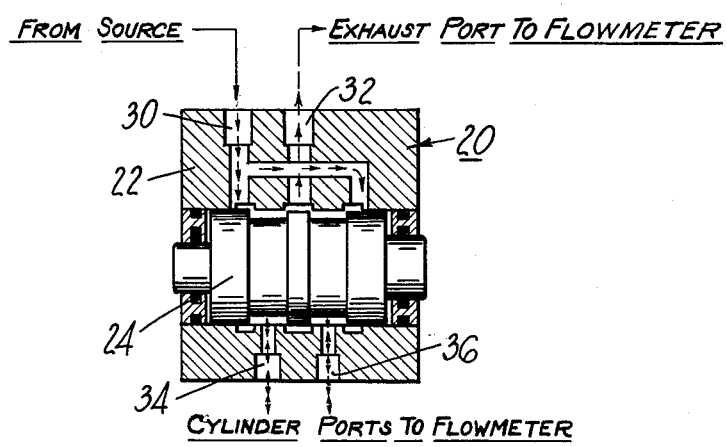
FIGURES 2, 3 and 4 are partial sectional views of the valve to be tested, the plunger of the valve being shown, respectively, in its neutral, left turn, and right turn positions.

FIGURE 5 is a sectional view of the valve holding and positioning mechanism of our invention; and this view also discloses details of one of the four air motor and coupling units for interconnecting the valve with the flowmeter; and FIGURE 6 is a view looking in the direction of the arrows 6—6 of FIGURE 1, disclosing the air transmitting connections between the valve being tested, the source of air pressure and the flowmeter, that is pressure indicating unit.

There is disclosed in FIGURES 1, 5 and 6 a preferred embodiment of my invention in which there is included a four part housing unit comprising a member 10 fixedly secured to a base portion 12; and the latter portion is fixedly secured to a base member 14. The housing unit also includes a bodily movable housing member 16 slidably mounted on the base portion 12. A manually operable toggle mechanism 18 serves to bodily move the member 16 to the right, FIGURE 5, to clamp a valve 20 in position ready to be tested. This valve is hereinafter described as a test valve. As is disclosed in FIGURE 1 of the drawings the valve 20 when in position to be tested is clamped in position between the members 16 and 10.

Figure 3:
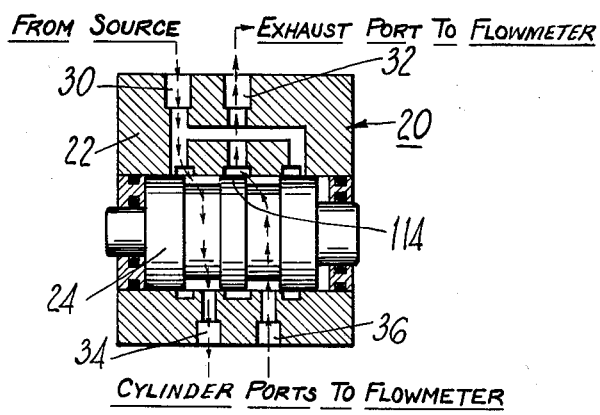
Figure 4:
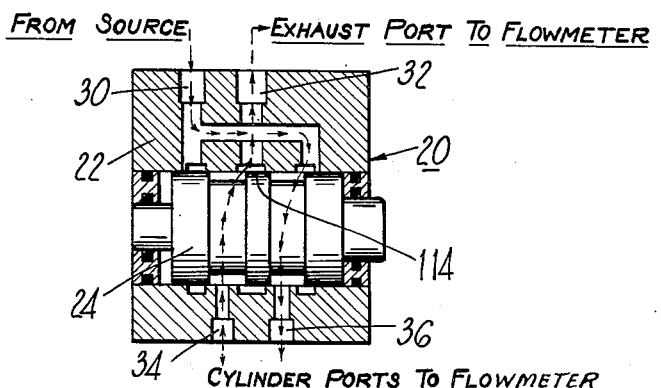

The valve to be tested, shown schematically in FIGURES 2 to 5 inclusive includes a casing 22 bored to receive a bodily movable valve spool 24 the ends of which are contacted by plungers 26 and 28, FIGURE 5. These plungers are slidably mounted, respectively, in the housing unit members 16 and 10. The valve is shown in its neutral position in FIGURES 2 and 5 in which compressed air, entering an intake port 30, flows, via exhaust port 32 and cylinder ports 34 and 36, and conduits 38, 40 and 42 connected, respectively, thereto, to a fluid pressure indicating unit 50, FIGURE 1. The plungers 26 and 28 are biased, by springs 52 and 54, away from the valve spool member 24; and the positioning of said plungers is effected by cam and stop members 56 and 58 in the operation of positioning the valve in the testing operation. When manually operated handle members 60 and 62 are both moved to their valve neutral positions then the valve is positioned as disclosed in FIGURES 2 and 5. When the right turn position of the valve, FIGURE 4, is desired the handle 62 is rotated so that the cam and stop member 58 functions as a stop; then the handle 60 is rotated to move the valve to its right turn position. The reverse operation of the handles 60 and 62 is effected to position the valve in its left turn position.

My invention also includes means for simultaneously coupling the three exhaust and cylinder valve ports to the conduits 38, 40 and 42 leading to the pressure indicator unit 50; and with this operation the intake port is coupled to a conduit 63. This operation is effected after the attendant locks the valve in position. This coupling operation is effected by four single acting vacuum motors one of which is disclosed in detail in FIGURE 5. This motor includes a casing 64 which houses a piston 66; and the four motors are all connected to a source of air pressure, not shown, via interconnected conduits 68, FIGURE 6. When a spring and solenoid operated three-way valve 70 is actuated by its solenoid 72 then the source of air pressure is connected to the conduit 68, FIGURE 1, via conduits 74 and 76. The conduit 74 may have incorporated therein suitable controls such as a reducing valve 78 and a filter 80. The motor casing 64, FIGURE 5, and the other three duplicate motor casings, not shown, also house a return spring 82 operable to move the piston 66 to the right when the solenoid 72 is de-energized to vent the conduits 68 to the atmosphere via the exhaust port of the three-way valve 70. The piston 66 is connected, by a rod 84, to a coupling 86 which, with an energization of the motor, serves to couple the valve port 33 with the conduit 38. All four air motors operate simultaneously to couple the four ports 30, 32, 34 and 36, FIGURES 2, 3 and 4, to the conduits 63, 38, 40 and 42 respectively; and this coupled condition is maintained until the hereinafter described tests are completed. As stated above the solenoid 72 is then de-energized whereupon the spring, not shown, in the valve 70 is operative to vent the conduit 68 to the atmosphere. The springs 82 of the four motors then operate to uncouple the conduits 38, 40, 42 and 63 and valve ports.

Describing now the complete operation of the testing mechanism of my invention, and incidently completing the description of parts of this mechanism not heretofore described, when the four tests have been completed and the controls returned to their off position solenoid operated cutoff valves 88, 90 and 92, FIGURE 1, incorporated in the conduits 38, 40 and 42, respectively, are in their open position, that is the valve 20 being tested is then in fluid transmitting connection with the pressure indicator 50. Furthermore in this off position of the controls the three-way valve 70 is in its exhaust position, a solenoid operated two-way valve 94 is in its cutoff position, a solenoid operated two-way valve 96 is in its exhaust position, a solenoid operated three-way valve 98 is in position to interconnect the conduit 63 with a conduit 100 connected to the valve 94, the cam and stop means, including the handles 60 and 62, are in their valve neutral position, and there is no test valve positioned in the apparatus.

The attendant then places a valve 20 between housing members 10 and 16, FIGURE 5, and clamps said valve in place by an operation of the toggle 18; whereupon he depresses a starter button 102, FIGURE 1, which initiates the operation of electrical means, not shown, to close the valve 96, close the valve 70 to interconnect the conduits 68 and 76, and open the valve 94 to provide a source of air pressure to the valve 20 being tested. The coupling motors then immediately operate to couple the test valve with the conduits 38, 40, 42 and 63; and inasmuch as said valve is then in its neutral position, FIGURES 2 and 5, it follows, as indicated by the arrows in FIGURE 2, that the air will flow into the indicator 50. If the bores and ports of the valve are of normal dimensions and free of large obstructions such as burrs then the air flowing into the indicator 50 via conduits 38, 40 and 42 will move bobbins therein until pressure switches operate to energize electric lamps 104, 106 and 108 in the indicator. These lamps are the color red until the air from the valve 20 operates to change them to green. The indicator 50 including its aforementioned switches and bobbins, may be of any standard design and is accordingly not shown in detail. If the valve 20 has been improperly cast and imperfections therein prevent the desired flow of air therethrough then the attendant will be advised of this fact by the lamps 104, 106 and 108 remaining red.

To test the valve for abnormal internal leakage the attendant, to carry out the second and third of the four tests, will move the handles 60 and 62 to simulate right and left turn operations of the test valve; one of the cams 56, 58 acting as a stop and the other an actuating means; and this operation will move the valve to one or the other of the positions disclosed in FIGURES 3 and 4 of the drawings. Prior to effecting these operations the valves 90 and 92, connected to the valve ports 34 and 36, are closed by the operation of a control button 110, FIGURE 1; and this operation cuts off the flow of air through the conduits 40 and 42 and diverts the air from the conduit 38 into a relatively short conduit 112. The undesired leakage of air past a land 114, FIGURE 3, to the exhaust port 32 is relatively small; accordingly the pressure switch, not shown, in the indicator column below the conduit 112 is operative at a relatively small air pressure. It follows that the pressure indicator 50 and associated ports are so calibrated that with an undesired leakage of air during the two turn operations of the valve a lamp 116 will show red in color.

To effect the fourth that is so-called external leakage test of the test valve the attendant brings into play a test cabinet indicated by the reference numeral 118, FIGURE 1. In this operation the attendant returns the test valve to its neutral position and then depresses a button 120 which brings the electrical means into play to close the valves 88, 90 and 92, operate the valve 98 to interconnect the conduit 63 with a conduit 122 connected with the cabinet 118, and initiate the operation of mechanism within said cabinet. This mechanism includes a solenoid operated valve operative to admit air at say 5 pounds pressure flowing from the source via a reducing valve 124 and conduits 126 and 128. The air is let into the cabinet for say 5 seconds whereupon it is automatically cut off; and a part of this air flows into the conduits 122 and 63 and valve 98; and into the valve 20 being tested. This trapped air is then left for say 18 seconds during which time the drop in pressure, due to external leaks in the valve, will be indicated on a dial 130. If this external leakage through seals, etc., is excessive the attendant will reject the valve being tested.

After the fourth that is external leakage test is completed the attendant will depress a button 132, FIGURE 1, to prepare the controls for the test of another valve; and with this operation the valves 88, 90 and 92 are opened, the valve 70 is operated to exhaust the coupler motors, the valve 94 is closed, the valve 96 is opened to exhaust, that is blow down the remainder of the air trapped in the test valve being tested, and the valve 98 is operated to reconnect the conduit 63 with the conduit 100. The attendant then removes the then tested valve 20 from the apparatus to complete the testing operation.

There is thus provided an effective test apparatus of relatively few parts; and one that will, in the short time required to make the four tests, indicate to the attendant the presence, if any, of imperfections that cause undesirable external or internal leakage of the valve or prevent the desired flow of power fluid through the valve.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates and which come within the scope of the appended claims.

I claim:

1. A valve testing apparatus comprising, in combination, a housing unit adapted to house a valve to be tested, said valve having a plurality of ports in its casing, said ports including first and second inlet ports, first and second outlet ports in series flow relationship with said first and second inlet ports, respectively, and an exhaust port adapted to communicate with said first and second outlet ports, a plurality of conduits adapted to be connected to said ports, power operated means including a plurality of single acting pressure differential operated motors for coupling the conduits to the valve ports, first manually operated means for locking a valve in place in the housing, second manually operated means for bodily moving the valve to any one of its operative positions when positioned in the housing unit, said single acting pressure differential operated motors being simultaneously operated independently of said second manually operated means, a fluid pressure indicator unit connected with the conduits and operative, during a test of the valve, to indicate the pressure exerted by a power fluid flowing within one or more of the conduits; together with a source of fluid pressure operably connected with one of said conduits, said conduit being connected to the said first and second intake ports of the valve being tested.

2. A valve testing apparatus for testing the pressure exerted by a power fluid flowing from a valve to be tested and the internal and external leakage of said valve, said apparatus including a housing unit adapted to house a valve to be tested, said valve having a plurality of inlet ports, a separate outlet port in series flow relationship with each of said inlet ports and an exhaust port adapted to communiacte with said plurality of outlet ports in its casing, a plurality of conduits adapted to be connected to said ports, a separate motor means associated with each of said conduits for actuating said conduits into sealed engagement with their associated ports, first control means for energizing said motor means simultaneously, and second control means having parts thereof incorporated in said conduits, said second control means including a testing unit for determining the external leakage of said valve, a source of air pressure for furnishing air to the conduits to effect the operation of the apparatus, and a control valve operable, in cooperation with a plurality of the conduits, to either connect the testing unit with the valve or connect the source of air pressure with said valve.

3. A valve testing apparatus comprising, in combination, a multi-port housing unit adapted to receive a valve to be tested, said valve having first and second inlet ports, first and second outlet ports in series flow relationship with said first and second inlet ports, respectively, an exhaust port adapted to communicate with said first and second outlet ports and a movable valve member positionable relative to said ports for controlling fluid flow therebetween, said movable valve member having a first position permitting communication between said first inlet port and said first outlet port and communication between said second outlet port and said exhaust port, said movable valve having a second position permitting communication between said second inlet port and said second outlet port and communication between said first outlet port and said exhaust port, said movable valve member having a null position whereby communication between said first and second inlet ports and associated first and second outlet ports is broken, first manually operated means operatively connected to said multi-port housing unit for actuating at least one part thereof to lock the valve in place in the housing unit, a plurality of conduits adapted to be connected to said first and second inlet ports, said first and second outlet ports and said exhaust port, means operatively connected to said conduits for actuating the same relative to said casing to thereby couple the conduits to their respective ports, said last named means including motor means separate from said housing unit and movable independently of said first named manually operated means, second manually operated means for bodily moving the valve to any one of said first, second or third positions, a fluid pressure indicator unit connected with said conduits and operative during a test of the valve to indicate the pressure exerted by a power fluid flowing within one or more of the conduits together with a source of fluid pressure operatively connected with one of said conduits, said conduit being connected to said first and second inlet ports of the valve being tested.

References Cited in the file of this patent
UNITED STATES PATENTS

| | | |
|---|---|---|
| 277,756 | Lunkenheimer | May 15, 1883 |
| 1,373,824 | McKenzie | Apr. 5, 1921 |
| 2,198,411 | Love | Apr. 23, 1940 |
| 2,462,116 | MacLachlan | Feb. 22, 1949 |
| 2,472,973 | Hoffman | June 14, 1949 |
| 2,573,646 | Koestering | Oct. 30, 1951 |
| 2,682,860 | Ruehl | July 6, 1954 |
| 2,691,773 | Lichtenberger | Oct. 12, 1954 |
| 2,720,782 | Stein | Oct. 18, 1955 |
| 2,771,769 | Nielsen | Nov. 27, 1956 |
| 2,863,316 | Abplanalp | Dec. 9, 1958 |